US011783373B2

(12) United States Patent
Randazzo et al.

(10) Patent No.: US 11,783,373 B2
(45) Date of Patent: Oct. 10, 2023

(54) SYSTEM AND METHOD FOR PROVIDING PEOPLE-BASED AUDIENCE PLANNING

(71) Applicant: Merkle, Inc., Columbia, MD (US)

(72) Inventors: Peter Randazzo, Port Washington, NY (US); John Gajewski, Dover, NH (US); John Lee, Wellesley, MA (US); Nicholas A. Illobre, New York, NY (US); Dionisio Espinal, Jr., New York, NY (US); Gerald Matthew Bavaro, Rockville Center, NY (US); Matthew Schultz, Carmel, NY (US); Michael Joyce, Glenview, IL (US); David Michael Yonchak, New London, NH (US); Kelly Renee Leger, Denver, CO (US)

(73) Assignee: MERKLE, INC., Columbia, MD (US)

( * ) Notice: Subject to any disclaimer, the term of this patent is extended or adjusted under 35 U.S.C. 154(b) by 0 days.

(21) Appl. No.: 17/200,556

(22) Filed: Mar. 12, 2021

(65) Prior Publication Data

US 2021/0201360 A1 Jul. 1, 2021

Related U.S. Application Data

(63) Continuation-in-part of application No. 16/214,769, filed on Dec. 10, 2018, now Pat. No. 10,956,943.
(Continued)

(51) Int. Cl.
*G06Q 30/00* (2023.01)
*G06Q 30/0251* (2023.01)
(Continued)

(52) U.S. Cl.
CPC ..... *G06Q 30/0269* (2013.01); *G06F 16/2358* (2019.01); *G06Q 30/0241* (2013.01);
(Continued)

(58) Field of Classification Search
CPC .............. G06Q 30/02–0277; G06F 16/2358
See application file for complete search history.

(56) References Cited

U.S. PATENT DOCUMENTS 6,947,898 B2   9/2005   Postrel
7,428,498 B2   9/2008   Voltmer
(Continued)

FOREIGN PATENT DOCUMENTS

WO   WO 02/088880 A2   11/2002

OTHER PUBLICATIONS

Buyya et al., "Cloudbus Toolkit for Market-Oriented Computing," CloudCom 2009, LNCS 5931, Springer-Verlag, Berlin, Germany, p. 24-44 (21 pages) (Year: 2009).
(Continued)

*Primary Examiner* — Raquel Alvarez
(74) *Attorney, Agent, or Firm* — Finnegan, Henderson, Farabow, Garrett & Dunner LLP

(57) ABSTRACT

Systems and methods for targeted advertising to specific consumers are disclosed. A system may include a memory storing instructions; and at least one processor configured to execute the instructions to: receive, over a network, consumer data from a client device; identify a plurality of client-provided consumers from the consumer data; obtain a plurality of unique consumer identifiers corresponding to the plurality of client-provided consumers; and identify at least one first overlapping unique consumer identifier by matching at least one of the plurality of client-provided consumers with at least one publisher-provided consumer provided by a first publisher device of a plurality of publisher devices, the first publisher device having a highest priority among the plurality of publisher devices.

19 Claims, 8 Drawing Sheets

Related U.S. Application Data which is a continuation of application No. 15/786,551, filed on Oct. 17, 2017, now Pat. No. 10,181,136.

(60) Provisional application No. 62/409,374, filed on Oct. 17, 2016.

(51) Int. Cl.
*G06Q 30/0241* (2023.01)
*G06Q 30/0242* (2023.01)
*G06F 16/23* (2019.01)

(52) U.S. Cl.
CPC ..... *G06Q 30/0243* (2013.01); *G06Q 30/0244* (2013.01); *G06Q 30/0246* (2013.01); *G06Q 30/0251* (2013.01); *G06Q 30/0255* (2013.01); *G06Q 30/0271* (2013.01); *G06Q 30/0277* (2013.01)

(56) References Cited

U.S. PATENT DOCUMENTS

| | | |
|---|---|---|
| 7,921,036 B1 | 4/2011 | Sharma et al. |
| 8,095,430 B2 | 1/2012 | Abhyanker |
| 8,843,394 B2 | 9/2014 | Cao et al. |
| 8,971,791 B2 | 3/2015 | Green et al. |
| 9,449,334 B1 | 9/2016 | Abou-Rizk et al. |
| 2002/0062249 A1 | 5/2002 | Iannacci |
| 2005/0021399 A1 | 1/2005 | Postrel |
| 2005/0119957 A1* | 6/2005 | Faber ............ G06Q 40/06 707/E17.108 |
| 2005/0165640 A1 | 7/2005 | Kotorov |
| 2007/0112631 A1 | 5/2007 | Voltmer |
| 2010/0076841 A1 | 3/2010 | Rajpure et al. |
| 2012/0035993 A1 | 2/2012 | Nangia |
| 2014/0095288 A1 | 4/2014 | Redford |
| 2014/0188528 A1 | 7/2014 | Oxenham et al. |
| 2015/0058120 A1 | 2/2015 | Guo et al. |
| 2015/0310499 A1 | 10/2015 | Brook |
| 2016/0080790 A1 | 3/2016 | Shkedi |
| 2016/0189226 A1 | 6/2016 | Rao |
| 2016/0283971 A1 | 9/2016 | Ernster et al. |
| 2017/0148051 A1 | 5/2017 | Bagheri et al. |

OTHER PUBLICATIONS

International Search Report and Written Opinion in International Application No. PCT/US2017/057019, dated Jan. 8, 2018 (9 pages).

* cited by examiner

| Consumer | High Lifetime Value | Recent Purchaser |
|---|---|---|
| xyz@yahoo.com | True | False |
| John Doe | False | True |
| ⋮ | | |
| (202) 123-4567 | True | False |

SYSTEM AND METHOD FOR PROVIDING PEOPLE-BASED AUDIENCE PLANNING

RELATED APPLICATIONS

This application is a continuation-in-part of application Ser. No. 16/214,769, filed Dec. 10, 2018, which is a continuation of U.S. application Ser. No. 15/786,551, filed Oct. 17, 2017 (now U.S. Pat. No. 10,181,136), which claims the priority of U.S. Provisional Patent Application No. 62/409,374, filed Oct. 17, 2016, which are hereby incorporated by references in their entirety.

TECHNICAL FIELD

The present disclosure generally relates to computerized systems and methods for providing people-based audience planning and targeted advertising.

BACKGROUND

A vendor may target specific consumers, in a population of consumers, to address individualized marketplace needs. For example, a vendor may provide promotions customized for certain potential customers. Such promotional content (e.g. advertisements) may be uniquely tailored to different consumers. Personalizing promotional content for electronic delivery can lead to an increase in revenues, but there are some shortcomings. For example, marketing to address singular customer needs may be overly burdensome, time consuming, infeasible due to scalability, and expensive.

Consumer needs and wants may overlap with other needs and wants. Marketing based on dividing a prospective consumer audience into discrete categories representative of a particular defining characteristic can be beneficial. For example, clustering based on select behavioral data, demographic data, and product preferences may improve efficiency and reduce cost. Segmentation according to these conventional categories, however, may deprive a marketer of the benefits of marketing by category. For example, two consumers of the same age may receive the same advertisement because they are categorized in the same manner based on age. However, these consumers may be at different stages of their lives and thus have different motivations or values. This can lead to one consumer in the category enthusiastically purchasing the advertised product while the other consumer is vehemently opposed to purchasing the product. Segmenting these two consumers solely on a single basis (e.g., age) can be inefficient and ineffective.

Conventional segmentation techniques may also cause privacy and security concerns. For example, it is common for conventional systems to identify consumers using identifiers or information that includes personal identifiable information (e.g., name, email address, phone number or the like). It is also common for conventional systems to exchange these identifiers over communication networks. This can lead to data leaks or losses that can potential expose personal identifiable information of the consumers to attackers or other unauthorized users. Furthermore, attackers (e.g., hackers) can use the personal identifiable information obtained from one attack against the same or additional consumers in subsequent attacks (e.g., using techniques such as phishing, social engineering or the like).

While conventional advertisement platforms allow an advertising client to supply the client's own consumer data, they are not compatible with or do not support the clients' own segmentations. Thus, the advertising client may not define their own segments. Moreover, in conventional advertisement platforms, when an advertising client seeks to publish a list of audiences from a set of consumer data, the platforms select the audiences based on a comparison of the set of consumer data with consumer data provided by a publisher to determine the list of audience from the set of consumer data. However, when the client seeks to publish the remainder of the set of consumer data, the platforms compare the entire set of the consumer data with consumer data provided by a second publisher, without excluding the list of audiences that are already published. This causes the publishing systems to operate inefficiently.

Therefore, there is a need for an improved method of providing people-based audience planning and targeted advertising.

SUMMARY

One aspect of the present disclosure is directed to a computer-implemented system for targeted advertising to specific consumers. The system may include a memory storing instructions; and at least one processor configured to execute the instructions to: receive, over a network, consumer data from a client device; identify a plurality of client-provided consumers from the consumer data; obtain a plurality of unique consumer identifiers corresponding to the plurality of client-provided consumers; and identify at least one first overlapping unique consumer identifier by matching at least one of the plurality of client-provided consumers with at least one publisher-provided consumer provided by a first publisher device of a plurality of publisher devices, the first publisher device having a highest priority among the plurality of publisher devices.

Another aspect of the present disclosure is directed to a computer-implemented method for targeted advertising to specific consumers. The computer-implemented method may include: receiving, over a network, consumer data from a client device; identifying a plurality of client-provided consumers from the consumer data; obtaining a plurality of unique consumer identifiers corresponding to the plurality of client-provided consumers; and identifying at least one first overlapping unique consumer identifier by matching at least one of the plurality of client-provided consumers with at least one publisher-provided consumer provided by a first publisher device of a plurality of publisher devices, the first publisher device having a highest priority among the plurality of publisher devices.

Yet another aspect of the present disclosure is directed to a non-transitory computer-readable medium storing instructions executable by a processor to perform a method for targeted advertising to specific consumers. The method may include: receiving, over a network, consumer data from a client device; identifying a plurality of client-provided consumers from the consumer data; obtaining a plurality of unique consumer identifiers corresponding to the plurality of client-provided consumers; and identifying at least one first overlapping unique consumer identifier by matching at least one of the plurality of client-provided consumers with at least one publisher-provided consumer provided by a first publisher device of a plurality of publisher devices, the first publisher device having a highest priority among the plurality of publisher devices.

Other systems, methods, and computer-readable media are also discussed herein.

DETAILED DESCRIPTION

Figure 1:
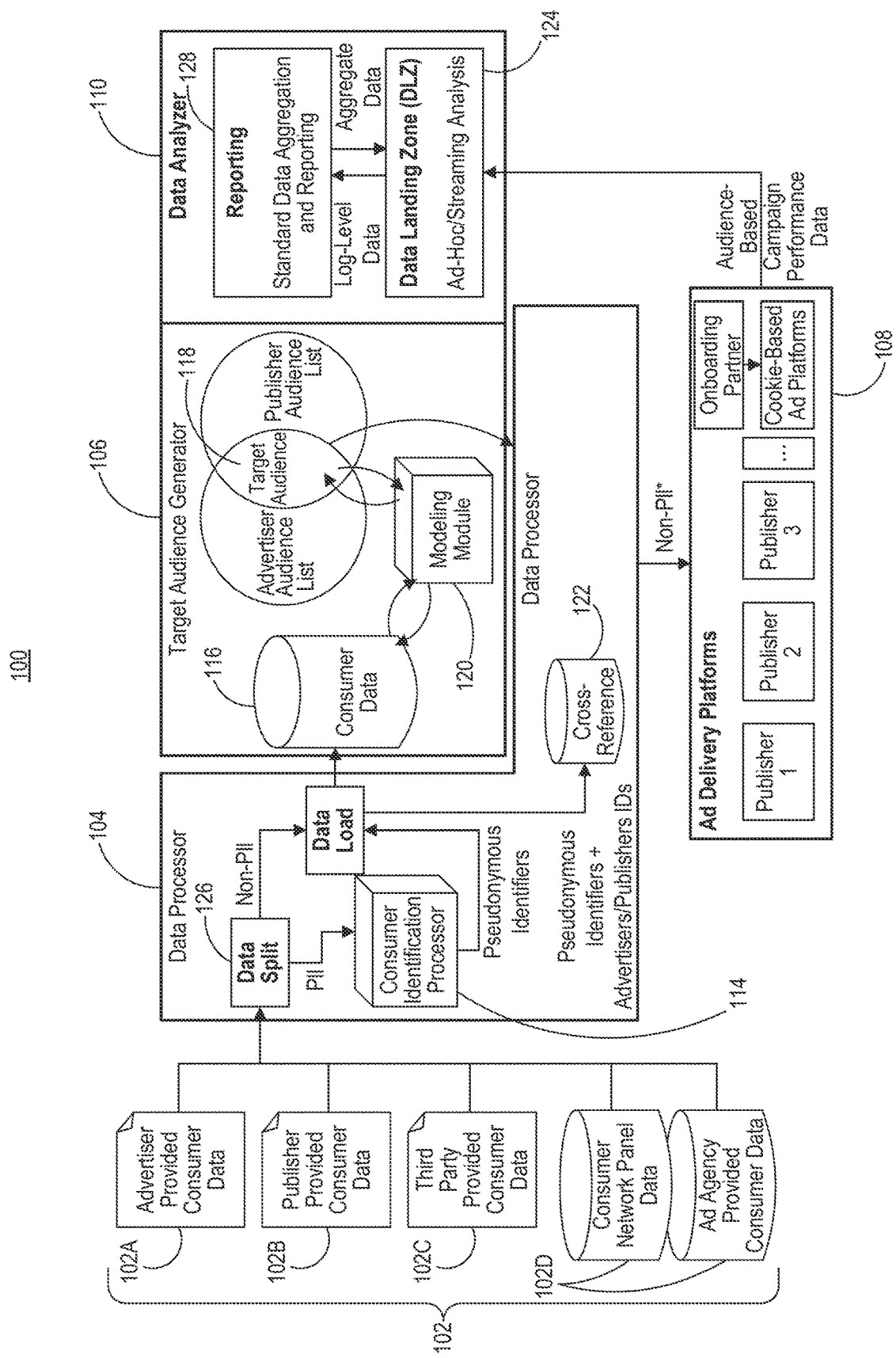
FIG. 1 is a schematic block diagram illustrating an exemplary embodiment of a system for targeted advertising to specific consumers, consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components and steps illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope of the invention is defined by the appended claims.

Embodiments of the present disclosure are directed to systems and methods configured for providing targeted advertising to specific consumers. For example, a client device (e.g., an advertiser or a publisher system) may provide consumer data to an advertisement agency over a network. Consumer data may include, for example, personal identifiable information (e.g., name, email address, phone number, street address, social security number or the like) and non-personal identifiable information (e.g., device identifiers, demographic data, segments, model scores or the like). The advertisement agency may process the consumer data and assign unique consumer identifiers to the consumers identified in the consumer data. In some embodiments, the unique consumer identifiers may not include any personal identifiable information. The advertisement agency may then generate a target audience pool for the client based on the unique consumer identifiers. Utilizing unique consumer identifiers, as in certain embodiments of the present disclosure, may help improve the efficiency of the target audience pool generation. Moreover, utilizing such unique consumer identifiers, as in certain embodiments of the present disclosure, may enhance data security, fidelity, and accuracy.

Referring to FIG. 1, a schematic block diagram depicting an exemplary embodiment of a system for targeted advertising is shown. As illustrated in FIG. 1, a system 100 may include one or more data sources 102, a data processor 104, a target audience generator 106, an application interface 108, and a data analyzer 110.

The data sources 102 may include consumer data 102A provided by one or more advertisers, consumer data 1026 provided by one or more publishers, consumer data 102C provided by one or more third-party data providers, or consumer data 102D provided by one or more advertisement agencies (e.g., agencies that provide targeted advertising services to adversities and publishers). In some embodiments, data in one or more of data sources 102 may be provided or stored as text files, binary files, database records, or various other types of computer-readable data formats.

In some embodiments, advertisers, publishers, third-party data providers, and advertisement agencies may utilize various types of computing devices to communicate with each other. Such computing devices may include, for example, servers, desktop computers, notebook computers, mobile devices, tablets, smartphones, wearable devices such as smart watches, smart bracelets, smart glasses, or any other devices that can communicate with a wired or wireless network.

In some embodiments, consumer data 102A provided by advertisers, consumer data 1026 provided by publishers, consumer data 102C provided by third-party data providers, and consumer data 102D provided by advertisement agencies may be stored in physically or logically separated data storage devices to mitigate data mixing. For instance, consumer data 102A provided by an advertiser may be stored in a first data storage device that is physically or logically separated from a second data storage device used to store consumer data 102B provided by a publisher. Similarly, consumer data 102C provided by a third-party data provider may be stored in a third data storage device that is physically or logically separated from a fourth data storage device used to store consumer data 102D provided by an advertisement agency. In some embodiments, consumer data 102A provided by different advertisers may be stored in physically or logically separated data storage devices. Similarly, consumer data 1028 provided by different publishers and consumer data 102C provided by different third-party data providers may be stored in physically or logically separated data storage devices. Such data storage devices may be implemented using any volatile or non-volatile memory including, for example, magnetic, semiconductor, tape, optical, removable, non-removable, or any other types of storage devices or computer-readable mediums.

The data processor 104 may serve as an entry point for the consumer data received from the various data sources 102A, 102B, 102C, or 102D. The data processor 104 may include one or more dedicated processing units, application-specific integrated circuits (ASICs), field-programmable gate arrays (FPGAs), or various other types of processors or processing units coupled with a non-transitory processor-readable memories configured for storing processor-executable code. When the processor-executable code is executed by the data processor 104, the data processor 104 may carry out instructions in response to various types of input signals received via the wired or wireless network.

In some embodiments, the data processor 104 may be configured to recognize personal identifiable information contained in the consumer data 102 (e.g., name, email address, phone number, street address, social security number or the like). The data processor 104 may be configured to recognize the personal identifiable information based on the labels associated with the data fields contained in the consumer data 102 (e.g., data fields contained in the consumer data 102 may be labeled "name," "email address," "phone number" or the like). Additionally or alternatively, the data processor 104 may be configured to recognize the personal identifiable information based on the format of the data presented (e.g., a 10-digit numerical string may be recognized as a phone number and a text string having an "@" symbol may be recognized as an email address). It is to be understood that the data processor 104 may be configured to recognize the personal identifiable information contained in the consumer data 102 using various other techniques without departing from the scope and spirit of the present disclosure. The data processor 104 may then utilize a data split processor 126 (which may be implemented as a component of the data processor 104) to separate the personal identifiable information (PII) contained in the consumer data 102 from non-personal identifiable information (non-PII) contained in the consumer data 102 (e.g., device identifiers, demographic data, segments, model scores or the like).

In some embodiments, the PII contained in the consumer data 102 may be processed separately with respect to the non-PII contained in the consumer data 102. For instance, as illustrated in FIG. 1, the PII contained in the consumer data 102 may be processed by a consumer identification processor 114 (which may be implemented as a component of the data processor 104). The consumer identification processor 114 may be configured to recognize one or more consumers identified in the consumer data 102 based on name, email address, phone number, street address, social security number or the like. In some embodiments, if the advertisement agency has access to a consumer database 102D, the consumer identification processor 114 may be able to recognize the consumers by comparing the consumer data 102A provided by the advertiser (or the consumer data 102B provided by the publisher) against the consumer database 102D.

In some embodiments, the consumer identification processor 114 may implement various types of data formatting, filtering, validation, parsing, standardization, normalization, or correction techniques to process the consumer data 102. In these embodiments, the consumer identification processor 114 may also utilize various types of deterministic or probabilistic processing techniques to facilitate the consumer recognition process. Suitable deterministic or probabilistic processing techniques may include, but are not limited to, consideration of variations on name spelling (e.g., "Robert" as "Rob," "Bob," "Bobby," etc.), variations on address presentation (e.g., "Road" or "Rd," with or without apartment unit numbers, spelling variations on city, etc.), correction of common email address errors (e.g., misspelled or transposed letters in domain names or the like), and deducing telephone area code based on city and state.

Consumer identification processor 114 may assign a unique consumer identifier to one or more consumers that have been recognized in consumer data 102 (e.g., by consumer identification processor 114). In some embodiments, the unique consumer identifiers assigned by the consumer identification processor 114 may not include any personal identifiable information. In other words, the unique consumer identifiers assigned by the consumer identification processor 114 are pseudonymous identifiers.

In some embodiments, each pseudonymous identifier assigned by the consumer identification processor 114 may uniquely identify a particular consumer at a particular street address. For instance, distinct identifiers may be assigned to each particular address, and likewise, distinct identifiers may be assigned to each consumer name. Unique pairings of address and consumer identifiers may then be assigned and exchanged as surrogates for the underlying PII data records without exposing the PII data in subsequent components. Such pseudonymous identifiers can provide anonymity compared to PII-based identifiers because the pseudonymous identifiers, by definition, do not contain personal identifying information of the consumers. The pseudonymous identifiers can also provide improved security, fidelity, and accuracy compared to identifiers such as those based on web cookies, device identifiers, or Internet Protocol (IP) addresses (which typically have multiple consumers mapped to the same identifier, creating noise and reducing data fidelity). In some embodiments, the consumer identification processor 114 may retain a cross-reference 122 between the pseudonymous identifiers and the identifiers originally used by the client (e.g., the advertiser or the publisher). This cross-reference 122 may be stored in one or more non-transitory processor-readable memories accessible to the consumer identification processor 114 (and the data processor 104 in general).

The pseudonymous identifiers assigned by the consumer identification processor 114 may then be merged together with the non-PII contained in the consumer data 102 to produce pseudonymous consumer data 116. It is noted that the pseudonymous consumer data 116 may now contain pseudonymously identifiable information that can be utilized to generate a target audience pool for the client without revealing any personal identifiable information of the consumers.

In some embodiments, the target audience pool is generated using a target audience generator 106. The target audience generator 106 may include one or more dedicated processing units, application-specific integrated circuits (ASICs), field-programmable gate arrays (FPGAs), or various other types of processors or processing units coupled with a non-transitory processor-readable memories configured for storing processor-executable code. When the processor-executable code is executed by the target audience generator 106, the target audience generator 106 may carry out instructions to generate a target audience pool. In some embodiments, the target audience generator 106 is configured to process only the pseudonymous consumer data 116. Utilizing the pseudonymous consumer data 116 in this manner may help improve the efficiency of the target audience generator 106.

For example, suppose that an advertiser wants to run a targeted advertisement on a platform operated by a publisher. It may be in both parties' interest to utilize the target audience generator 106 to generate an audience pool for the targeted advertisement. To do so, the advertiser and the publisher may choose to provide their corresponding customer base (i.e., consumer data) 102A and 102B to the target audience generator 106. The advertiser-provided consumer data 102A and the publisher-provided consumer data 102B may be processed first by the data processor 104, which may purge personal identifying information from the data provided to produce the pseudonymous consumer data 116 as described above. The target audience generator 106 may then obtain a list of consumers 118 common to both advertiser-provided consumer data and publisher-provided consumer data. This list of consumers 118 can be obtained very efficiently by matching pseudonymous identifiers associated with the advertiser-provided consumer data against pseudonymous identifiers associated the publisher-provided consumer data after they have been processed by the data processor 104.

In some embodiments, the list of consumers 118 common to both advertiser-provided consumer data and publisher-provided consumer data may readily be identified as the target audience pool. Alternatively, the list of consumers 118 may be considered as a basis pool, which may then be expanded utilizing one or more lookalike audience models 120. For example, the target audience generator 106 may analyze the non-personal identifiable information (e.g., demographic data, segments, model scores or the like) associated with the consumers identified in the list of consumers 118 to obtain one or more top attributes describing such consumers. The top attribute(s) identified in this manner may then be utilized to help identify additional consumers provided by third-party data providers (e.g., data derived from consumer data 102C) or the advertisement agencies (e.g., data derived from consumer data 102D).

In another example, the advertiser may choose to ask the target audience generator 106 to process the advertiser-provided consumer data 102A without having to take into consideration any publisher-provided consumer data. The advertiser-provided consumer data 102A may be processed by the data processor 104, which may produce the pseudonymous consumer data 116 as described above. The target audience generator 106 may then analyze the pseudonymous consumer data 116 produced based on the advertiser-provided consumer data 102A to identify one or more top attributes describing the advertiser-provided consumer data 102A. The top attribute(s) identified in this manner may then be utilized to help identify additional consumers provided by third-party data providers (e.g., data derived from consumer data 102C) or the advertisement agencies (e.g., data derived from consumer data 102D).

It is to be understood that the target audience generation techniques described above are presented as examples and are not meant to be limiting. It is to be understood that specific implementations of target audience generation processes may vary from the examples presented above without departing from the scope and spirit of the present disclosure.

Figure 2:
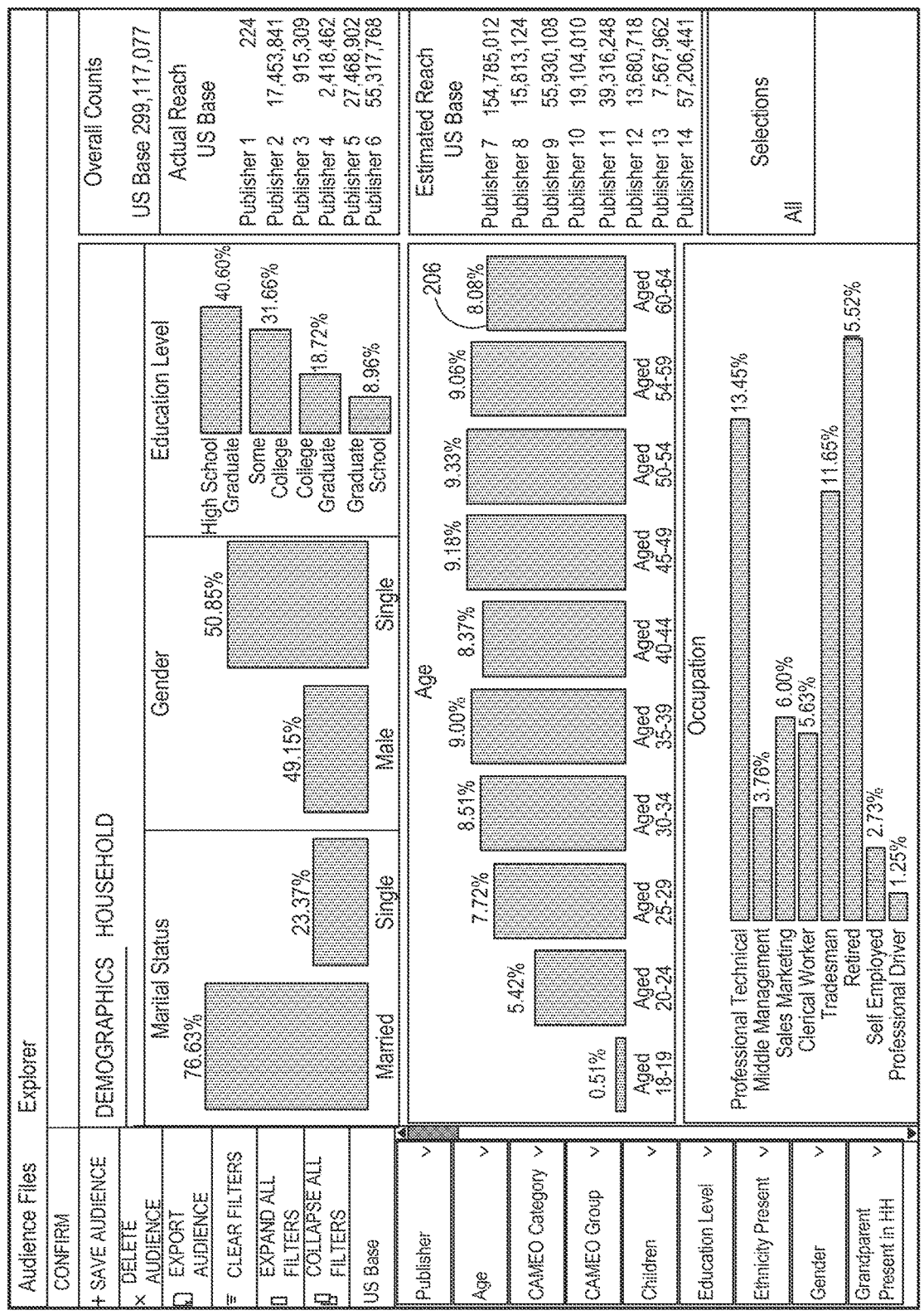
FIG. 2 is a diagrammatic illustration of an exemplary target audience review interface, consistent with the disclosed embodiments.

In some embodiments, once a target audience pool is generated, the target audience generator 106 may deliver the target audience pool (e.g., over a network) to the advertiser for review and approval. FIG. 2 is an illustration depicting an exemplary review interface. In this example, the target audience pool is generated based on consumer data recorded in an electronic consumer database 102D provided by an advertisement agency. The electronic consumer database 102D, in one embodiment, includes millions of records relating to consumers, each record having more than 1,000 attributes, including, but not limited to, email addresses, phone records, vehicle records, IP addresses, mortgage information, lifestyle/behavioral data, demographics data, transactional cooperative data, life events data (e.g., new movers, new homeowners, new parents, tri-bureau credit triggers and the like), wealth indicators, credit statistics, automotive data and automotive statistics, real property data, social media handles/flags, social influence, other syndicated research data and the like. Other embodiments of electronic consumer database 102D are possible as well.

It is contemplated that the advertiser may utilize the exemplary review interface shown in FIG. 2 to confirm or to modify the target audience pool. For example, the exemplary review interface may include a visual representation 204 of the target audience pool. The visual representation 204 may include one or more graphics indicating the composition of the target audience pool. For example, the visual representation 204 may indicate the composition in terms of education levels, gender, marital status or the like. The visual representation 204 may also indicate the composition in terms of age groups, occupations or the like. The visual representation 204 may further indicate the estimated reach (and if available, the actual reach based on historical/recorded data) of the advertisement if the advertiser approves the target audience pool presented.

The exemplary review interface may also include a control panel 202 configured to receive control input from the advertiser. For example, if the advertiser chooses not to target a specific age group 206, the advertiser may select the age group 206 (e.g., by clicking the age group 206 using a computer mouse) and click the "DELETE AUDIENCE" button in the control panel 202 to remove that specific age group 206 from the target audience pool. The modifications made by the advertiser may be communicated to the target audience generator 106 over the network, and the target audience generator 106 may adjust the target audience pool accordingly. On the other hand, if the advertiser is satisfied with the target audience pool, the advertiser may choose to confirm/approve the target audience pool by clicking the "CONFIRM" button in the control panel 202.

It is to be understood that the exemplary review interface shown in FIG. 2 is presented merely as an example and is not meant to be limiting. Once the advertiser confirms/approves the target audience pool, the application interface 108 may deliver the target audience pool to one or more publishers upon receipt of the advertiser's approval.

In some embodiments, because the target audience generator 106 is configured to process only the pseudonymous consumer data 116, the target audience pool generated by the target audience generator 106 may not contain certain identifiers required by the publishers. It is therefore noted that, in some embodiments, a publisher may require the target audience pool to be converted according to a publisher-specified conversion protocol so that the target audience pool delivered to the publisher may contain the identifiers required by the publishers.

In some embodiments, the data processor 104 may be configured to serve as a controlled exit point for converting/modifying the pseudonymous identifiers based on publisher specifications as needed. More specifically, in some embodiments, the data processor 104 may utilize the cross-reference dataset 122 populated earlier in the pseudonymous identifier generation process (described above) to help translate the pseudonymous identifiers contained in the target audience pool. For example, if the publisher uses web cookies or device identifiers to identify its target audience, the data processor 104 may convert the pseudonymous identifiers contained in the target audience pool to web cookies or device identifiers using reference data stored in the cross-reference dataset 122. Similarly, if the publisher uses hashed emails to identify its target audience, the data processor 104 may convert the pseudonymous identifiers contained in the target audience pool to hashed emails using reference data stored in the cross-reference dataset 122. The application interface 108 may then provide the target audience pool with converted identifiers to the publishers to carry out the advertisement campaign.

It is to be understood that the conversion described above is not always required. In certain embodiments, for example, the publisher may partner with the advertisement agency and may therefore have shared access to the pseudonymous identifiers. In such embodiments, the application interface 108 may provide the target audience pool to the publisher directly without conversion, and the publisher may identify the consumers in the target audience pool using the pseudonymous identifiers and carry out the targeted advertisement campaign.

In some embodiments, the performance data associated with the advertisement campaign may be collected and analyzed by the system 100. For instance, some publishers may provide log level details associated with their advertisement campaigns. The log level details may include information regarding the advertiser, the publisher, the advertisement campaign, the audience, the date, time, and location where the advertisements appeared, as well as the impression and click counts associated with the advertisement campaigns. The system 100 may utilize a data analyzer 110 to collect the log level details in a storage area 124 (commonly referred to as a staging area or a data landing zone). The data analyzer 110 may then use the log level details collected in the storage area 124 to facilitate data analysis.

For example, the data analyzer 110 may use the log level details collected in the storage area 124 to determine performance metrics, including, but not limited to, impressions, click-through rate, completion rates, percentage complete, engagement time, engagement rate and the like. The data analyzer 110 may then provide a report 128 containing the performance metrics to the advertiser or the publisher to evaluate the effectiveness of the advertisement campaign. In some embodiments, the data analyzer 110 may present the performance metrics to the advertisement agency, the advertiser, or the publisher through an interactive user interface (e.g., a web page or a mobile device application). Alternatively or additionally, the data analyzer 110 may present the performance metrics to the advertisement agency, the advertiser, or the publisher as periodical reports. In some embodiments, the presentation of the performance metrics (whether through an interactive user interface or through periodical reports) may include text or graphical representation as shown in FIG. 3.

Figure 3:
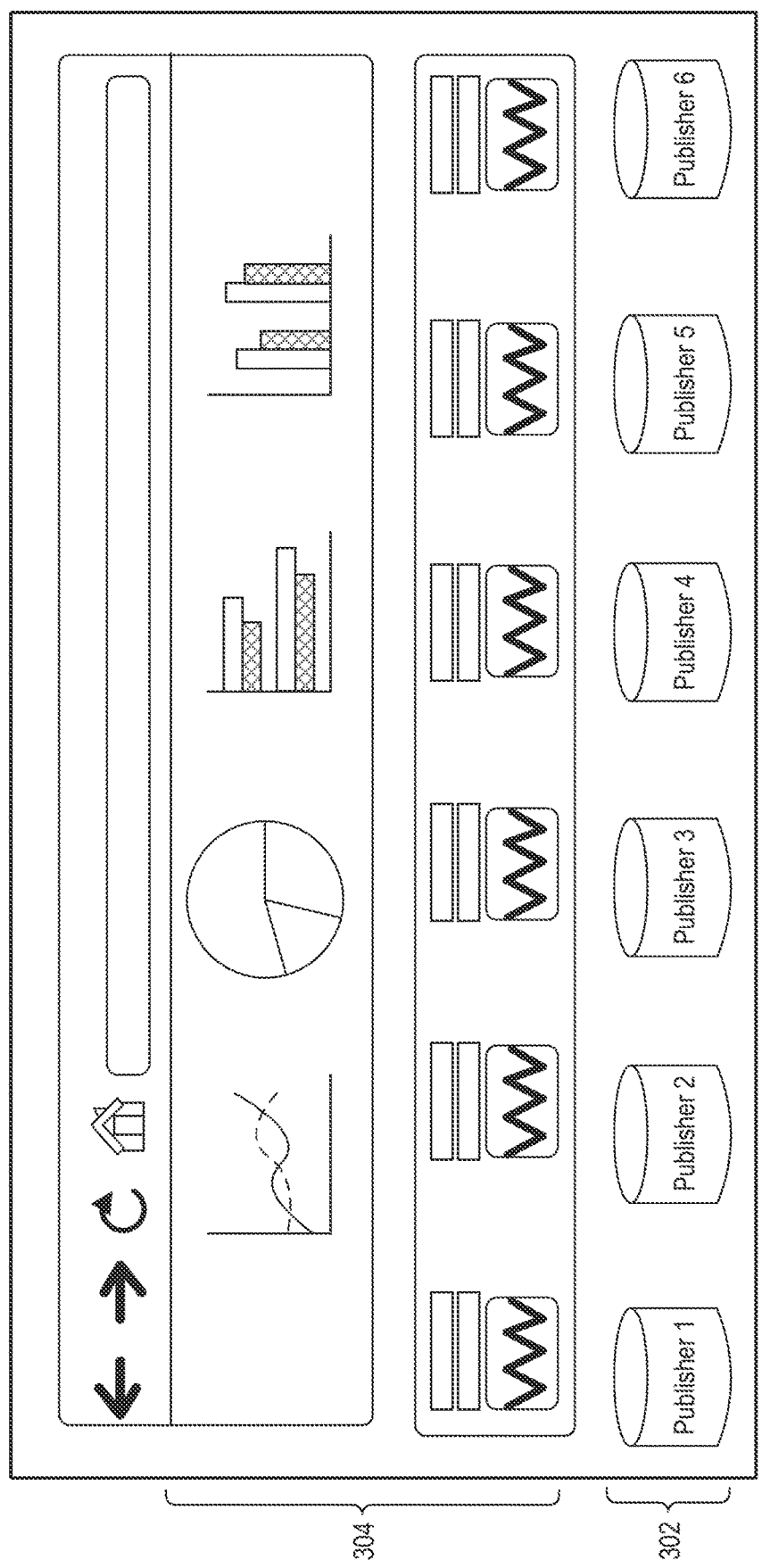
FIG. 3 is a diagrammatic illustration of an exemplary performance report, consistent with the disclosed embodiments.

It is noted that FIG. 3 is merely a simplified example depicting an exemplary format for presenting performance metrics. For example, a panel 302 may provide the user a list of publishers involved in a particular advertisement campaign. In an interactive user interface, the user may select one of the publishers from the panel 302 and a display area 304 may display the performance metrics associated with the selected publisher. The display area 304 may display the performance metrics in various formats, including line charts, pie charts, bar charts, or text descriptions. In some embodiments, while the performance metrics may be aggregated, the aggregated performance metrics may be further analyzed against segments and demographic attributes made available in the pseudonymous consumer data 116 to provide additional insights.

Figure 4:
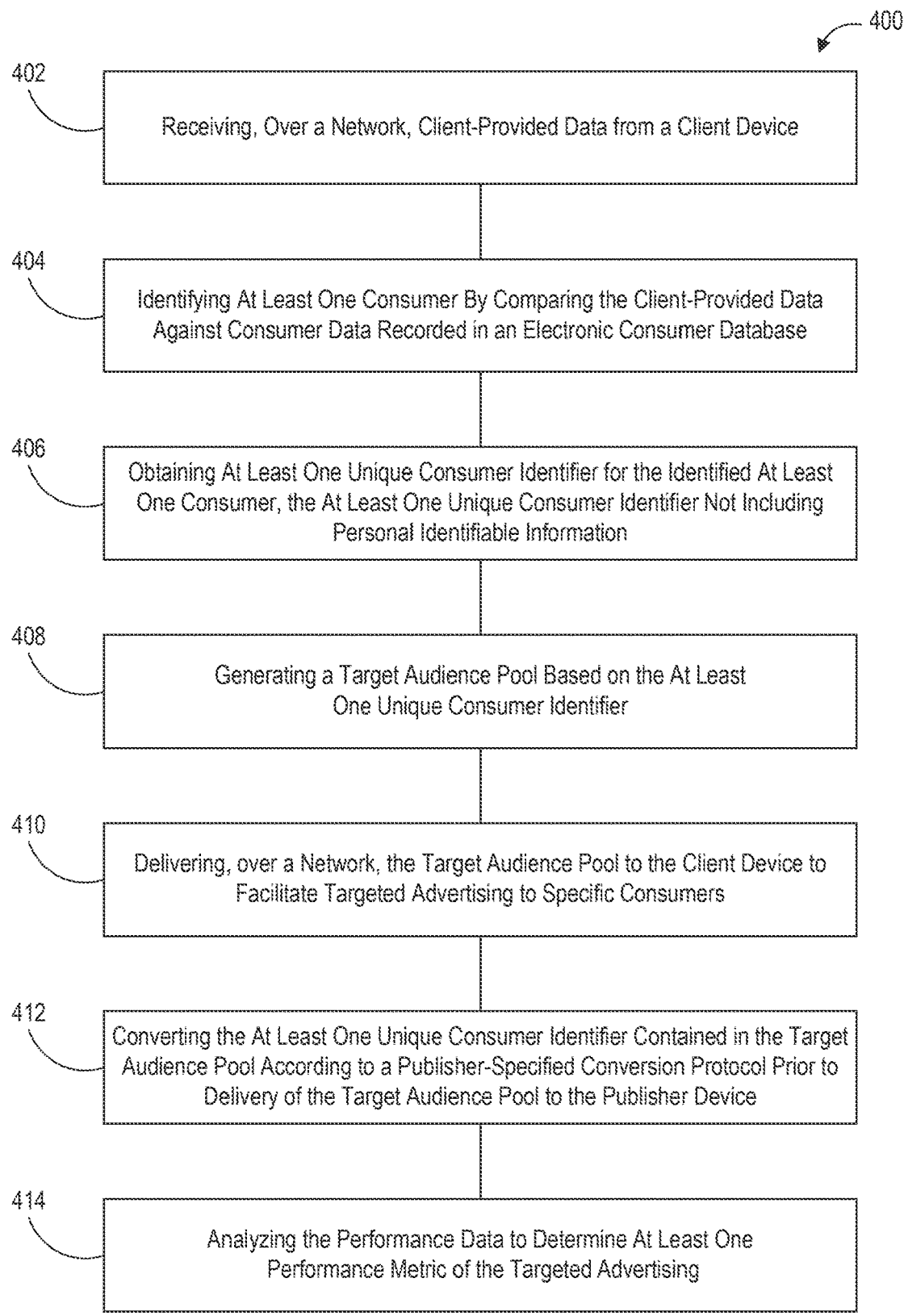
FIG. 4 is a flow chart illustrating an exemplary method for targeted advertising to specific consumers, consistent with the disclosed embodiments.

Referring now to FIG. 4, a flow diagram illustrating an exemplary method 400 for targeted advertising to specific consumers consistent with the disclosed embodiments is shown. While the exemplary method 400 is described herein as a series of steps, it is to be understood that the order of the steps may vary in other implementations. In particular, steps may be performed in any order, or in parallel. It is to be understood that each step of method 400 may be performed by one or more processors, computers, servers, controllers or the like.

In some embodiments, the method 400 may be performed by the system 100 (as depicted in FIG. 1). At step 402, the method 400 may include receiving, by the system 100, over a network, client-provided data from a client device. The client may be an advertiser or a publisher. The client may provide its customer base (i.e., its consumer data) to the system 100. The consumer data may include personal identifiable information (PII) as well as non-personal identifiable information (non-PII) about the consumers. The consumer data may also include client-assigned identifiers.

At step 404, the method 400 may include identifying one or more consumers identified in the client-provided data. The consumers may be identified by matching the client-provided data against consumer data recorded in an electronic consumer database. In some embodiments, the electronic consumer database may include millions of records relating to consumers, each record having more than 1,000 attributes, including, but not limited to, email addresses, phone records, vehicle records, IP addresses, mortgage information, lifestyle/behavioral data, demographics data, transactional cooperative data, life events data (e.g., new movers, new homeowners, new parents, tri-bureau credit triggers and the like), wealth indicators, credit statistics, automotive data and automotive statistics, real property data, social media handles/flags, social influence, other syndicated research data and the like. It is to be understood that the electronic consumer database may be expanded to include consumers based in other regions as well.

At step 406, the method 400 may assign unique consumer identifiers to the consumers identified in the client-provided data. In some embodiments, the unique consumer identifiers assigned to the consumers do not include personal identifiable information originally contained in the client-provided data. In other words, the unique consumer identifiers assigned in this manner are pseudonymous identifiers. In some embodiments, a cross-reference between the pseudonymous identifiers and the client-assigned identifiers originally provided by the client is retained. This cross-reference may be utilized later to help convert the pseudonymous identifiers to the client-assigned identifiers if such a conversion is required by the client.

At step 408, the method 400 may include generating a target audience pool. As described above with respect to FIG. 1, the system 100 may generate the target audience pool using consumer data provided by an advertiser alone, or in conjunction with consumer data provided by one or more publishers, third-party data providers, as well as advertisement agencies. It is noted that the basis of the target audience pool generation process is the pseudonymous identifiers. In other words, in some embodiments, the step 408 does not directly compare the consumer data provided by the advertiser against the consumer data provided by the publisher. Rather, in those embodiment, the step 408 may be configured to generate the target audience pool by matching pseudonymous identifiers associated with the advertiser-provided consumer data against pseudonymous identifiers associated the publisher-provided consumer data.

At step 410, the method 400 may include delivering, by the system 100, over a network, the target audience pool to the client device to facilitate targeted advertising to specific consumers. The step 410 may deliver the target audience pool to an advertiser for review and approval. The advertiser may request a change to the target audience pool if needed. Otherwise, the advertiser may approve the target audience pool, in which case the advertiser may proceed with a purchase of the targeted advertising.

In some embodiments, the method 400 may include a step 412 configured to convert the pseudonymous identifiers used to generate the target audience pool to identifiers recognized by a publisher. This conversion may be facilitated using the cross-reference previously mentioned. In some embodiments, the step 412 may convert the pseudonymous identifiers to web cookie-based identifiers, device identifiers, or hashed email-based identifiers. It is to be understood that the step 412 may convert the pseudonymous identifiers to other types of client-assigned identifiers without departing from the spirit and scope of the present disclosure.

In some embodiments, the method 400 may also include a step 414 configured to provide performance analysis of the targeted advertising. For instance, some publishers may provide log level details associated with their advertisement campaigns. The log level details may include information regarding the advertiser, the publisher, the advertisement campaign, the audience, the date, time, and location where the advertisements appeared, as well as the impression and click counts associated with the advertisement campaigns. The step 414 may collect the log level details and use the collected log level details to provide data analysis as previously described.

Referring to FIG. 1, in some embodiments, the advertiser-provided consumer data 102A, the publisher-provided consumer data 102B, the third-party provided consumer data 102C, and the advertisement-agency provided consumer data 102D may include at least one flagged consumer record indicating a consumer record's enrollment in a class or a segment within the consumer data. In some embodiments, the at least one flagged consumer record may be flagged with a binary digit "0" or "1". In another embodiment, the at least one flagged consumer record may be flagged with a "yes" or "no". In another embodiment, the at least one flagged consumer record is flagged with a "true" or "false".

Figure 5:
FIG. 5 is an exemplary table illustrating a flagged consumer record indicating a consumer record's enrollment in a class or a segment within consumer data, consistent with the disclosed embodiments.

FIG. 5 is an exemplary table 500 illustrating flagged consumer record indicating a consumer record's enrollment in a class or a segment within consumer data, consistent with the disclosed embodiments. For example, in table 500, the class is a high lifetime value consumer class and the at least one flagged consumer record is flagged with indication that the consumer is a high lifetime value consumer and not a recent purchaser. As shown in FIG. 5, table 500 includes a column on the leftmost side indicating the consumers using personal identifiable information such as an email address (xyz@yahoo.com), a name (John Doe), a phone number ((202)123-4567), etc. However, the indication of the consumers is not so limited, and can be other personal identifiable information, such as street addresses or social security numbers of consumers, or non-personal identifiable information such as device identifiers, demographic data, segments, or model scores of the consumers. Table 500 includes a column in the middle including flags (true or false) indicating whether the consumers listed on the leftmost column are high lifetime value consumers or not. For example, the consumer identified with the email address (xyz@yahoo.com) and the consumer identified with the phone number ((202)123-4567) are high lifetime value consumers, while the consumer identified with the name (John Doe) is not a high lifetime value consumer. Table 500 also includes a column on the rightmost side including flags (true or false) indicating whether the consumers listed on the leftmost column are recent purchasers or not. For example, the consumer identified with the email address (xyz@yahoo.com) and the consumer identified with the phone number ((202)123-4567) are not recent purchasers, while the consumer identified with the name (John Doe) is a recent purchaser.

In some embodiments, the system 100 (e.g., the data processor 104 or the target audience generator 106) may apply a set of modeling techniques and an automated fashion to identify one or more consumers whose data profiles are statistically similar to data profiles of a seed set of consumers. For example, the system 100 may identify one or more consumers whose data profiles are statistically similar to data profiles of a seed set of consumers. The seed set of consumers may be provided by a customer base of an advertiser.

In some embodiments, system 100 (e.g., the data processor 104 or the target audience generator 106) may segment or sub-segment consumers into one or more subsets, each of the one or more subsets including one or more statistically similar consumers. For example, in developing an audience pool of "car lovers", the system 100 may divide consumers into effectively identical populations, and test to see whether the population favors a particular type of offer or message or creative treatment or an alternative option. Statistical similarity of two consumers may be determined based on event statistics of the consumers, for example, how many times the consumers bought the same type of car, how many times the consumers clicked on the same advertisement, how many times the consumers skipped the same advertisement, or how many times the consumers visited the same car dealer, etc. The degree of similarity may also be quantitively determined based on the statistical data collection and analysis. In this way, an automatic segmenter functionality is introduced to divide a given audience population into statistically similar subsets, leading to increased efficiency.

In some embodiments, system 100 (e.g., the data processor 104 or the target audience generator 106) may generate a unique audience list record in which audiences are curated based on an advertiser specification. The system 100 may further generate identity keys for the audiences in the unique audience list and send the generated identity keys to a second advertisement platform and/or a programmatic partner. In this way, the second advertisement platform or the programmatic partner may recognize the feature of the list of the audiences without performing detailed analysis on the consumer data, leading to an enhanced efficiency.

Figure 6:
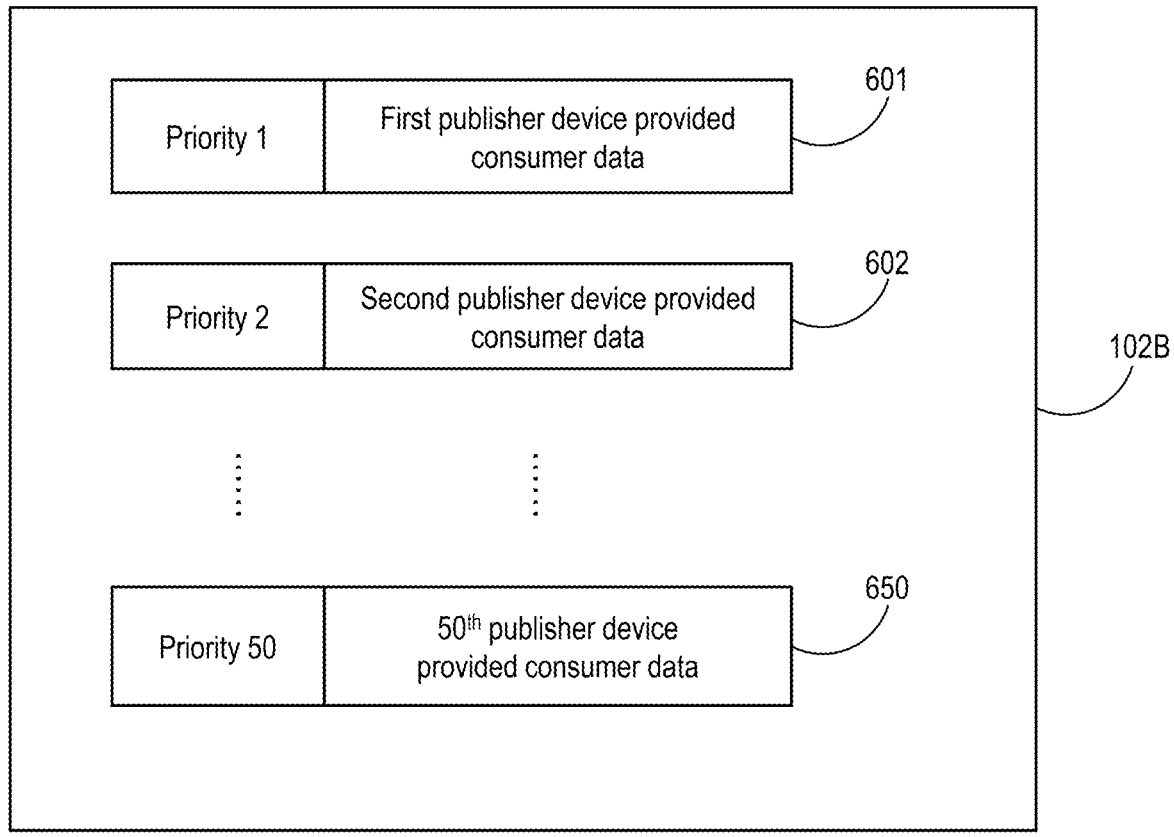
FIG. 6 is a schematic diagram illustrating a plurality of data provided by corresponding plurality of publisher devices and assigned priority of the data, consistent with the disclosed embodiments.

Referring to FIG. 1, in some embodiments, the publisher-provided consumer data 102B may include data provided by a plurality of publisher devices. The system 100, for example, the data processor 104 or the target audience generator 106, may assign priority to consumer data provided by the plurality of publisher devices, for example, based on importance or relevance of the consumer data. FIG. 6 is a schematic diagram illustrating a plurality of data provided by corresponding plurality of publisher devices and assigned priority of the data, consistent with the disclosed embodiments. As an example, FIG. 6 shows consumer data 102B provided by fifty different publisher devices, and the priority of the data listed in a descending order. For example, the consumer data 601 provided by a first publisher device has the top priority (priority 1), the consumer data 602 provided by a second publisher device has a second priority (priority 2) and the consumer data provided by $50^{th}$ publisher has $50^{th}$ priority (priority 50).

In some embodiments, the consumer data provided by the plurality of different publisher devices may be stored in physically or logically separated data storage devices to mitigate data mixing. For instance, consumer data 601 provided by the first publisher device may be stored in a first data storage device that is physically or logically separated from a second data storage device used to store consumer data 602 provided by the second publisher device and a 50th data storage device used to store consumer data 650 provided by the 50th publisher device. FIG. 6 shows consumer data provided by fifty different publisher devices. However, the number of publishers is not so limited, and can be any number that is smaller or greater than fifty.

Figure 7B:
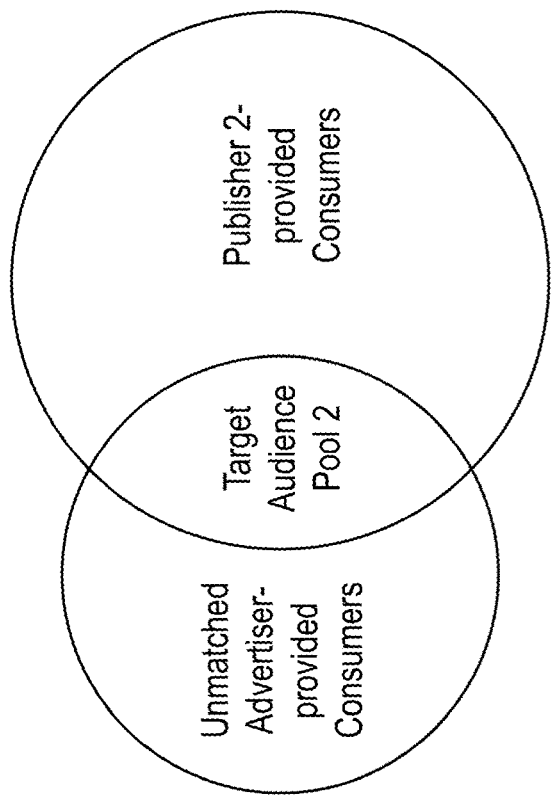
FIG. 7B is a schematic diagram illustrating a second matching test of the waterfall matching test, consistent with the disclosed embodiments.
Figure 7A:
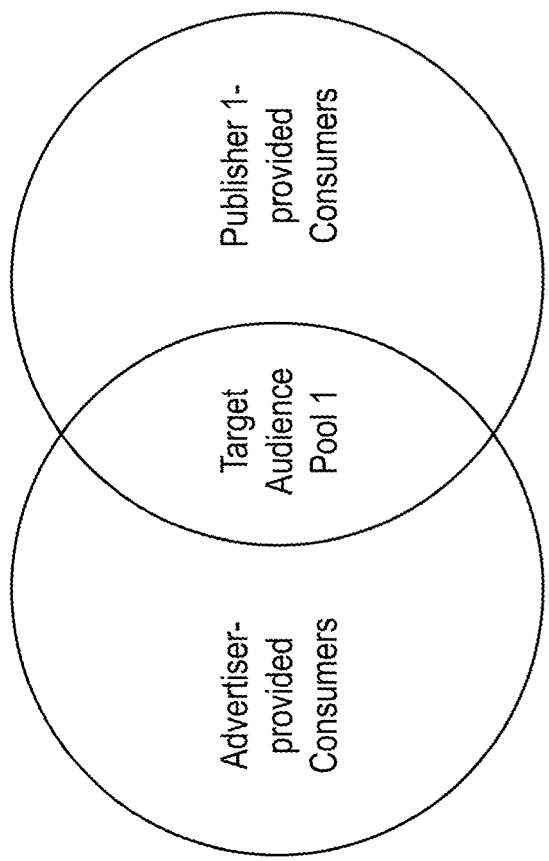
FIG. 7A is a schematic diagram illustrating a first matching test of a waterfall matching test, consistent with the disclosed embodiments.
Figure 8:
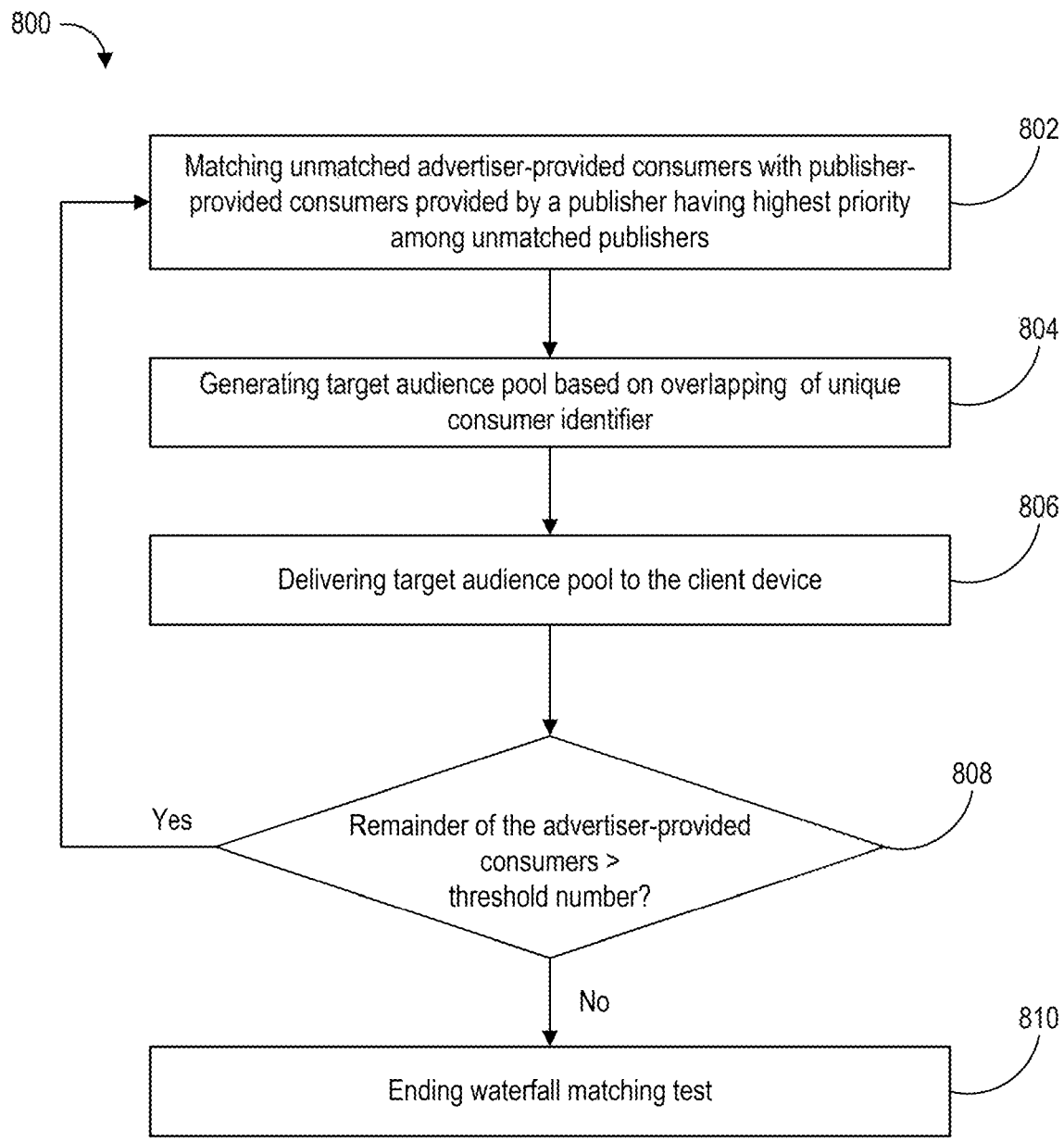
FIG. 8 is a flow diagram illustrating an exemplary method for a waterfall matching test, consistent with the disclosed embodiments.

In some embodiments, in identifying target audiences using the consumer data provided by the plurality of different publishers as shown in FIG. 6, the target audience generator 106 may utilize a waterfall matching test, as described with regard to FIGS. 7A, 7B, and 8. In this test, the target audience generator 106 may receive, over a network, consumer data from an advertiser device, and identify a plurality of advertiser-provided consumers from the consumer data. For example, the target audience generator 106 may identify the plurality of advertiser-provided consumers by comparing the consumer data received from the advertiser device against consumer data recorded in an electronic consumer database of the system 100, as discussed above. The target audience generator 106 may obtain a plurality of unique consumer identifiers corresponding to the plurality of advertiser-provided consumers. The plurality of unique consumer identifiers may not include personal identifiable information. The target audience generator 106 may then identify at least one first overlapping unique consumer identifier by matching at least one of the plurality of advertiser-provided consumers with at least one publisher-provided consumer provided by a first publisher device of the plurality of publisher devices, the first publisher device having a highest priority among the plurality of publisher devices.

FIG. 7A is a schematic diagram illustrating a first matching test of a waterfall matching test consistent with the disclosed embodiments. As shown in FIG. 7A, the target audience generator 106 may match a plurality of advertiser-provided consumers (indicated by the left circle of FIG. 7A) with the consumers provided by publisher 1 having the highest priority and obtain a target audience pool 1 common to both advertiser-provided consumer data and the publisher-provided consumer data. The target audience pool 1 can be obtained by matching pseudonymous identifiers associated with the advertiser-provided consumer data against pseudonymous identifiers associated the consumer data provided by publisher 1 after they have been processed by the data processor 104.

After the first matching test, the target audience generator 106 may determine whether a number of unmatched consumers of the plurality of advertiser-provided consumers is greater than a threshold number. For example, in FIG. 7A, the portion of the advertiser-provided consumers excluding the target audience pool 1 indicates the unmatched consumers. The threshold number may be a number predetermined by the system 100. If the number of the unmatched consumers is greater than the threshold number, the target audience generator 106 may identify at least one second overlapping unique consumer identifier by matching at least one of the unmatched consumers with at least one publisher-provided consumer provided by a second publisher device of the plurality of publisher devices. The second publisher device has a second highest priority among the plurality of publisher devices.

FIG. 7B is a schematic diagram illustrating a second matching test of the waterfall matching test consistent with the disclosed embodiments. As shown in FIG. 7B, the target audience generator 106 may match the unmatched advertiser-provided consumers (indicated by the left circle of FIG. 7B) with the consumers provided by publisher 2 having a second highest priority and obtain a target audience pool 2 common to both unmatched advertiser-provided consumer data and the consumer data provided by publisher 2. The target audience pool 2 can be obtained by matching pseudonymous identifiers associated with the unmatched advertiser-provided consumer data against pseudonymous identifiers associated the consumer data provided by publisher 2 after they have been processed by the data processor 104.

After the second matching, again, the target audience generator 106 may determine whether a number of unmatched consumers (the advertiser-provided consumers excluding both the target audience pool 1 and the target audience pool 2) is greater than a threshold number. If the number of the unmatched consumers is greater than the threshold number, the target audience generator 106 may perform a third matching test. The target audience generator 106 may iterate matching remaining consumers of the plurality of advertiser-provided consumers with consumers provided by a publisher having highest priority among unmatched publishers (the publishers whose consumer data were not compared with the advertiser-provided consumer data) until a number of the remaining consumers is smaller than the threshold number. The target audience generator 106 may select a publisher device among the plurality of publisher devices based on a descending order of priority of the plurality of publisher devices. For example, the target audience generator 106 may select a publisher device based on the table in FIG. 6.

In some embodiments, after each matching test, the target audience generator 106 may further identify one or more consumers whose data profiles are statistically similar to data profiles of a seed set of consumers. In some embodiments, after each matching, the target audience generator 106 may further segment or sub-segment consumers into one or more subsets, each of the one or more subsets including one or more statistically similar consumers.

In some embodiments, after each matching test, the target audience generator 106 may generate a unique audience list record in which audiences are curated based on an advertiser specification, and further generate identity keys for the audiences in the unique audience list and send the generated identity keys to a second advertisement platform and/or a programmatic partner. For example, after the first matching, the target audience generator 106 may generate a unique audience list record using the target audience pool 1 (FIG. 7A) in which audiences are curated based on an advertiser specification. The target audience generator 106 may also generate identity keys for the audiences in the unique audience list and send the generated identity keys to an advertisement platform and a programmatic partner.

In some embodiments, after each matching test, the target audience generator 106 may receive an advertiser approval of the purchase of media advertising and deliver a pool of the target audience obtained from the matching to a corresponding publisher device upon receipt of the advertiser approval. For example, after the first matching, the target audience generator 106 may receive an advertiser approval of the purchase of media advertising and deliver the target audience pool 1 to the first publisher device upon receipt of the advertiser approval. The target audience generator 106 may convert the at least one first unique consumer identifier contained in the target audience pool 1 according to a publisher-specified conversion protocol prior to delivery of the target audience pool to the first publisher device. For example, the target audience generator 106 may convert the at least one first unique consumer identifier contained in the target audience pool 1 to at least one of: a web cookie-based identifier, a television-based identifier, a hashed email-based identifier, or a device identifier, prior to delivery of the target audience pool 1 to the first publisher device.

In some embodiments, after each matching, the target audience generator 106 may generate a target audience pool and deliver the target audience pool to the advertiser device. For example, after the first matching, the target audience generator 106 may generate the target audience pool 1 and deliver the target audience pool 1 (FIG. 7A) to the advertiser device to facilitate targeted advertising to specific consumers. Similarly, after the second matching, the target audience generator 106 may generate a target audience pool 2 (FIG. 7B) and deliver the target audience pool 2 to the advertiser device to facilitate targeted advertising to specific consumers.

FIG. 8 is a flow diagram illustrating an exemplary method 800 for waterfall matching test consistent with the disclosed embodiments. It is to be understood that each step of method 800 may be performed by one or more processors, computers, servers, controllers or the like. In some embodiments, the method 800 may be performed by the system 100, for example, by the target audience generator 106, as depicted in FIG. 1.

At step 802, the method 800 may include matching unmatched advertiser-provided consumers with publisher-provided consumers provided by a publisher having highest priority among unmatched publishers. For example, for a first matching test, the unmatched consumers are the original advertiser-provided consumers, for example, as indicated by left circle of FIG. 7A. For any subsequent matching test, the unmatched consumers are a portion of the original advertiser-provided consumers after excluding all matched consumers in the previous matching test(s), for example, the unmatched advertiser-provided consumers indicated by the left circle of FIG. 7B.

At step 804, the method 800 may include generating a target audience pool based on overlapping of unique consumer identifiers. For example, the target audience pool may be generated by obtaining a group of consumers common to both the unmatched advertiser-provided consumer data and the publisher-provided consumer data. The target audience can be obtained by matching pseudonymous identifiers associated with the advertiser-provided consumer data against pseudonymous identifiers associated the consumer data provided by the publisher, as discussed above.

At step 806, the method 800 may include delivering target audience pool to the client device. For example, the generated target audience pool may be delivered to the advertiser device to facilitate targeted advertising to specific consumers.

At step 808, the method 800 may include determining whether a remainder of the advertiser-provided consumers is greater than a threshold number. If the remainder of the advertiser-provided consumers is greater than the threshold number, the method 800 returns to step 802 and iterates the steps 802, 804, 806, and 808 until the remainder of the advertiser-provided consumers provided does not exceed the threshold number.

At step 810, the method 800 may include ending the waterfall matching test if the remainder of the consumers provided by the client device does not exceed the threshold number.

While the present disclosure has been shown and described with reference to particular embodiments thereof, it will be understood that the present disclosure can be practiced, without modification, in other environments. The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. Various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A computer-implemented system for targeted advertising to specific consumers, the system comprising:
    a memory storing instructions; and
    at least one processor configured to execute the instructions to:
        receive, over a network, consumer data from a client device;
        identify a plurality of client-provided consumers from the consumer data;
        obtain a plurality of unique consumer identifiers corresponding to the plurality of client-provided consumers;
        identify at least one first overlapping unique consumer identifier by matching at least one of the plurality of client-provided consumers with at least one publisher-provided consumer provided by a first publisher device of a plurality of publisher devices, the first publisher device having a highest priority among the plurality of publisher devices, and the highest priority being assigned based on importance or relevance of a plurality of data provided by the plurality of publisher devices;
        generate a first target audience pool based on the at least one first overlapping unique consumer identifier;

determine whether a number of unmatched consumers of the plurality of client-provided consumers is greater than a threshold number; and based on determining that the number of the unmatched consumers is greater than the threshold number, identify at least one second overlapping unique consumer identifier by matching at least one of the unmatched consumers with at least one publisher-provided consumer provided by a second publisher device of the plurality of publisher devices, wherein the second publisher device has a second highest priority among the plurality of publisher devices.

2. The system of claim 1, wherein:
the consumer data received from the client device comprises at least one flagged consumer record indicating a consumer record's enrollment in a class or a segment within the consumer data.

3. The system of claim 2, wherein:
the at least one flagged consumer record is flagged with a binary digit "0" or "1".

4. The system of claim 2, wherein:
the at least one flagged consumer record is flagged with a "yes" or "no".

5. The system of claim 2, wherein:
the at least one flagged consumer record is flagged with a "true" or "false".

6. The system of claim 2, wherein the class is a high lifetime value consumer class and the at least one flagged consumer record is flagged with indication that the consumer is a high lifetime value consumer and not a recent purchaser.

7. The system of claim 1, wherein the at least one processor is further configured to execute the instructions to:
identify one or more consumers whose data profiles are statistically similar to data profiles of a seed set of consumers.

8. The system of claim 7, wherein the seed set of consumers are provided by a customer base of the client.

9. The system of claim 1, wherein the at least one processor is further configured to execute the instructions to:
segment client-provided consumers into one or more subsets, each of the one or more subsets including one or more statistically similar consumers.

10. The system of claim 1, wherein the at least one processor is further configured to execute the instructions to:
deliver the first target audience pool to the client device to facilitate targeted advertising to specific consumers.

11. The system of claim 10, wherein the at least one processor is further configured to execute the instructions to:
receive an advertiser approval of the purchase of media advertising; and
deliver the first target audience pool to the first publisher device upon receipt of the advertiser approval.

12. The system of claim 11, wherein the at least one processor is further configured to execute the instructions to:
convert the at least one first unique consumer identifier contained in the first target audience pool according to a publisher-specified conversion protocol prior to delivery of the target audience pool to the first publisher device.

13. The system of claim 12, wherein the at least one processor is further configured to convert, prior to delivery of the first target audience pool to the first publisher device, the at least one first unique consumer identifier contained in the first target audience pool to at least one of: a web cookie-based identifier, a television-based identifier, a hashed email-based identifier, or a device identifier.

14. The system of claim 1, wherein the at least one processor is further configured to execute the instructions to:
iterate matching remaining consumers of the plurality of client-provided consumers with consumers provided by a publisher having highest priority among unmatched publishers until a number of the remaining consumers is smaller than the threshold number, wherein the at least one processor is configured to select a publisher device among the plurality of publisher devices based on a descending order of priority of the plurality of publisher devices.

15. The system of claim 1, wherein the at least one processor is further configured to execute the instructions to:
generate a second target audience pool based on the at least one second overlapping unique consumer identifier; and
deliver the second target audience pool to the client device to facilitate targeted advertising to specific consumers.

16. The system of claim 1, wherein the at least one processor is further configured to execute the instructions to:
generate a unique audience list record in which audiences are curated based on an advertiser specification; and
generate identity keys for the audiences in the unique audience list and send the generated identity keys to an advertisement platform or a programmatic partner.

17. The system of claim 1, wherein the at least one processor is further configured to execute the instructions to:
assign priority to the plurality of publisher devices based on the importance or relevance of the plurality of data provided by the plurality of publisher devices; and
list the priority of the plurality of publisher devices in a descending order.

18. A computer-implemented method for targeted advertising to specific consumers, the method comprising:
receiving, over a network, consumer data from a client device;
identifying a plurality of client-provided consumers from the consumer data;
obtaining a plurality of unique consumer identifiers corresponding to the plurality of client-provided consumers;
identifying at least one first overlapping unique consumer identifier by matching at least one of the plurality of client-provided consumers with at least one publisher-provided consumer provided by a first publisher device of a plurality of publisher devices, the first publisher device having a highest priority among the plurality of publisher devices, and the highest priority being assigned based on importance or relevance of a plurality of data provided by the plurality of publisher devices;
generating a first target audience pool based on the at least one first overlapping unique consumer identifier;
determining whether a number of unmatched consumers of the plurality of client-provided consumers is greater than a threshold number; and
based on determining that the number of the unmatched consumers is greater than the threshold number, identifying at least one second overlapping unique consumer identifier by matching at least one of the unmatched consumers with at least one publisher-provided consumer provided by a second publisher device of the plurality of publisher devices,
wherein the second publisher device has a second highest priority among the plurality of publisher devices.

19. A non-transitory computer-readable medium storing instructions executable by a processor to perform a method for targeted advertising to specific consumers, the method comprising:

receiving, over a network, consumer data from a client device;

identifying a plurality of client-provided consumers from the consumer data;

obtaining a plurality of unique consumer identifiers corresponding to the plurality of client-provided consumers; and identifying at least one first overlapping unique consumer identifier by matching at least one of the plurality of client-provided consumers with at least one publisher-provided consumer provided by a first publisher device of a plurality of publisher devices, the first publisher device having a highest priority among the plurality of publisher devices, and the highest priority being assigned based on importance or relevance of a plurality of data provided by the plurality of publisher devices;

generating a first target audience pool based on the at least one first overlapping unique consumer identifier;

determining whether a number of unmatched consumers of the plurality of client-provided consumers is greater than a threshold number; and based on determining that the number of the unmatched consumers is greater than the threshold number, identifying at least one second overlapping unique consumer identifier by matching at least one of the unmatched consumers with at least one publisher-provided consumer provided by a second publisher device of the plurality of publisher devices, wherein the second publisher device has a second highest priority among the plurality of publisher devices.

\* \* \* \* \*